March 4, 1958
L. A. HUNNICUTT ET AL
2,825,478
HAY AND SILAGE CARRIER
Filed Feb. 29, 1956
3 Sheets-Sheet 1
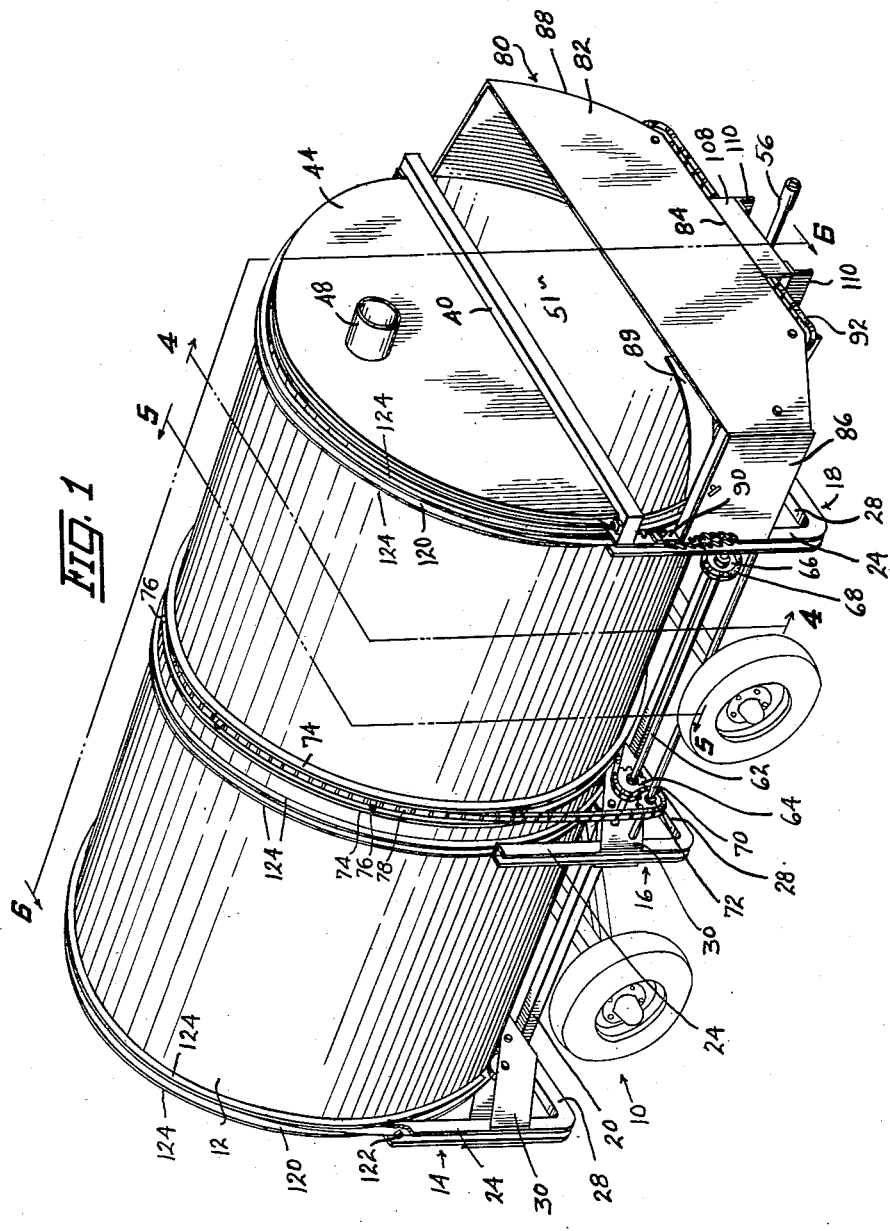
INVENTORS.
LEON A. HUNNICUTT
HARVEY J. HUHN
BY
ATTORNEY.

March 4, 1958  L. A. HUNNICUTT ET AL  2,825,478
HAY AND SILAGE CARRIER
Filed Feb. 29, 1956  3 Sheets-Sheet 2
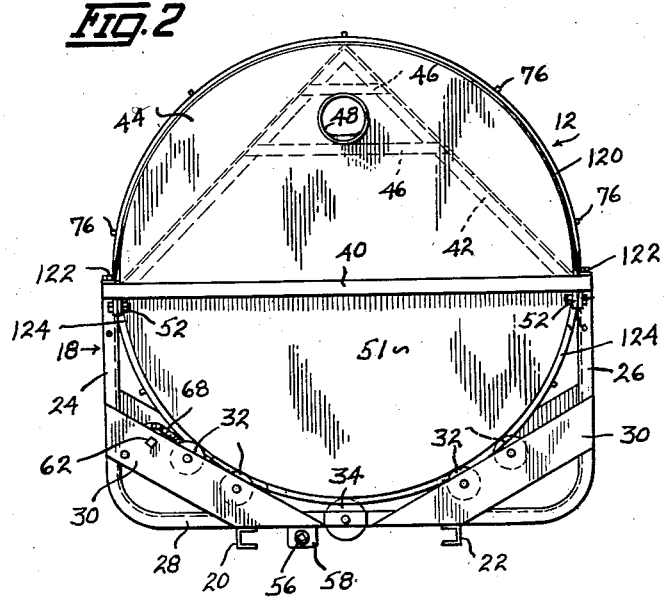
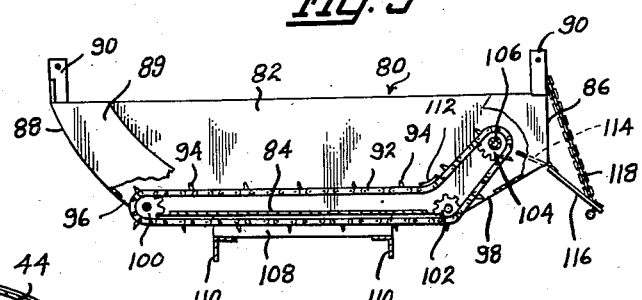
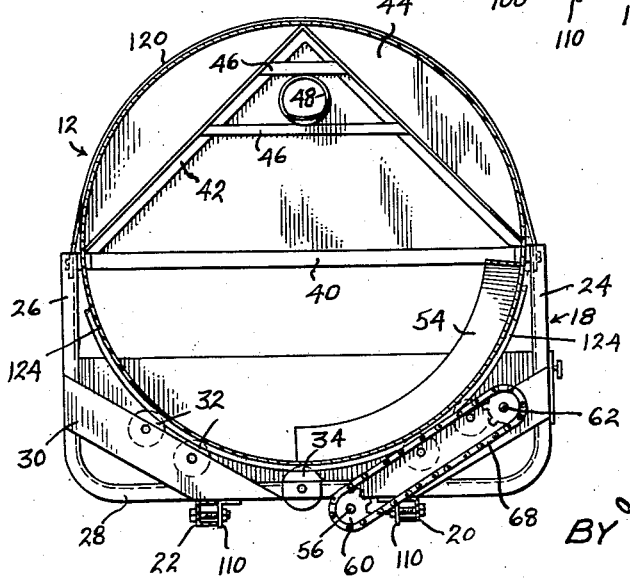
INVENTORS.
LEON A. HUNNICUTT
HARVEY J. HUHN
BY
ATTORNEY.

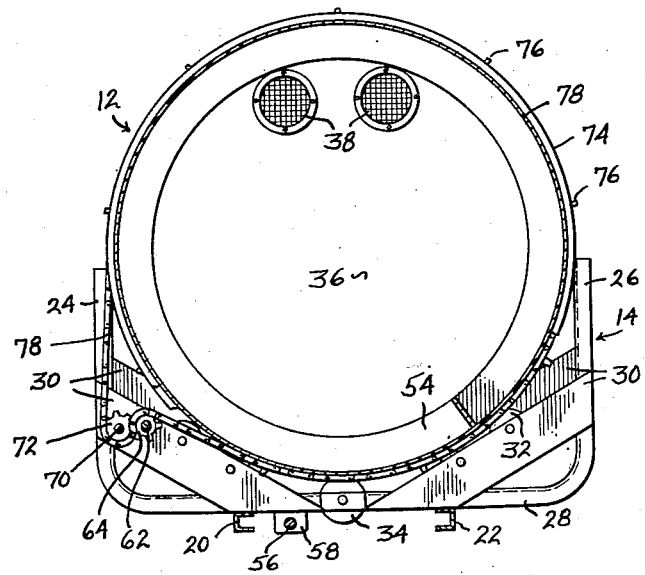
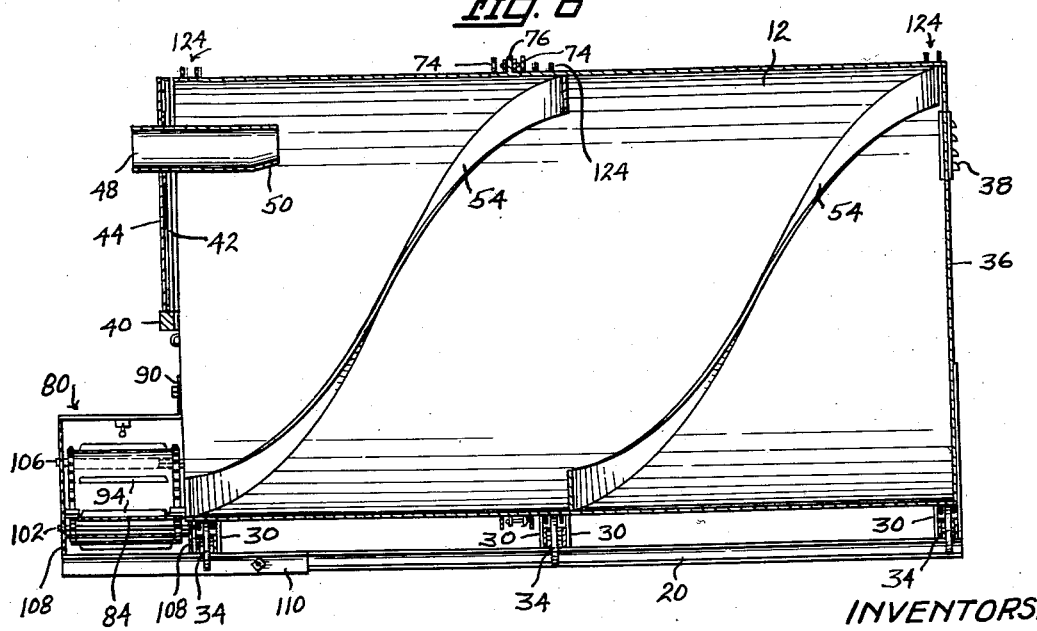
INVENTORS.
LEON A. HUNNICUTT
HARVEY J. HUHN
BY Morton S. Adler
ATTORNEY.

2,825,478
HAY AND SILAGE CARRIER

Leon A. Hunnicutt, Ledyard, and Harvey J. Huhn, Tama, Iowa

Application February 29, 1956, Serial No. 568,600

1 Claim. (Cl. 214—507)

Our invention relates to a new and improved carrier for hay, silage and like materials.

These materials after being harvested are usually blown into a carrier which is generally an open top wagon and while such procedure is commonplace, there are certain drawbacks and disadvantages involved which we have observed and which we have overcome. Included in the disadvantages is the fact that much material can be lost particularly in the loading procedure and also during transportation especially under windy conditions. In addition the susceptibility of the load to becoming wet during a rain is an unfavorable factor together with the fact that the unloading of the material is an arduous and time consuming task.

Accordingly therefore we have as one of the important objects of this invention the provision of a self unloading carrier for hay, silage and like materials that is designed to be operated from the power take-off of a tractor.

Another object of our invention is to provide a carrier of the above class designed to provide protection for the contents therein from the elements.

A further object inhering in this invention is the provision of a conveyor means for receiving the contents of the carrier as they are unloaded so as to deposit them in a predetermined location.

Other objects and advantages of this invention reside in the details of construction and correlation of the various parts and will be apparent as the description proceeds.

This invention consists of novel parts and combination of parts to be hereinafter described whereby the objects set forth are attained, as pointed out in the claim, and illustrated in the accompanying drawings, in which:

Fig. 1 is a perspective view of our invention shown mounted for illustration on a wheeled chassis, and showing the conveyor unit attached at the front, Fig. 2 is a front elevational view with the conveyor unit removed, Fig. 3 is a rear elevational view of the conveyor unit with portions cut away to more fully illustrate its construction, Fig. 4 is a cross sectional view taken from the line 4—4 of Fig. 1, Fig. 5 is a cross sectional view taken from the line 5—5 of Fig. 1, and Fig. 6 is a longitudinal section view taken on the line 6—6 of Fig. 1.

Referring to the drawings a wheeled chassis shown generally at 10 in Fig. 1 illustrates how our carrier may be mounted for transportation but no invention is claimed for the chassis, it being merely illustrative as indicated. Our carrier which is in the form of a cylindrical housing or drum 12 is supported by a suitable frame which is shown as a plurality of upstanding spaced apart U shaped frame members 14, 16, and 18 preferably of channel material, that are secured in their spaced relationship by means of a pair of rails or supports 20 and 22. Thus arranged frame members 14 and 18 define the respective rear and front of the supporting unit and rails 20 and 22 extend to and between these limits. The chassis 10, when used, is mounted to the rails 20 and 22.

It will be understood that each frame member 14, 16 and 18 consist of the parallel upstanding arms 24 and 26 and the integral horizontal connecting bar or rail 28. On each frame 14, 16 and 18 and extending at an approximate 45° angle between each respective arm 24 and 26 and the central portion of rail 28 we provide a pair of brackets 30 in parallel position on opposite sides of the channel member forming the frames 14, 16 and 18, and rotatably journalled between each set of these brackets are the rollers 32. A similar roller 34 is likewise mounted at the center of each rail 28 as shown in Figs. 2, 5 and 6. Our carrier housing or member 12 is arranged longitudinally within the supporting structure just described so as to rest on the several rollers 32 and 34 as shown in Figs. 1, 2, 4 and 5, and is rotatable on such support about its longitudinal axis as will later appear.

The rear end 36 of carrier 12 (Fig. 5) is closed and is provided with air vents in the form of screened openings 38 or any other suitable means such as louvers or the like. The front end as seen in Fig. 4 is open although a closure is provided therefore which does not engage the front end to interfere with its rotation. This is provided by a bar member 40 secured to and extending between the upper end of arms 24 and 26 on frame 18 (Fig. 1) at which point it substantially bisects the opening at the front of the carrier: an A frame 42 is mounted to the upper side of bar 40 to which is attached a piece of sheet metal or the like 44 shaped to cover the upper half of the front of carrier 12. Transversely through sheet 44 and supported by braces 46 near the apex of frame 42 is a short tube or pipe 48 which projects on each side of sheet 44 and is designed to receive the discharge end of a tube or hose (not shown) from a hay picker or the like. On the inner side of sheet 44, the tube 48 is sloped upwardly as at 50 so as to deflect incoming hay, silage or the like upwardly in order to prevent a premature accumulation thereof near the front of the carrier. To the underside of bar 40 a door 51, shaped similarly to sheet 44, is hingedly detachably depended by the pins 52.

On the inner surface of carrier 12 we have formed the spirally arranged plates or flange-like member 54 extending from front to rear and projecting inwardly from the inner surface thereof. This may be one continuous spiral member or may be more than one and preferably we have used two having them overlap somewhat in the front center portion of the carrier. These spiral members 54 operate similarly to a screw conveyor in moving hay and the like when the carrier rotates as will be later described.

Power to rotate the carrier 12 is obtained from the power take-off of a tractor and is accomplished in the following manner. A shaft 56 (Fig. 1) connectible to the power take-off of a tractor (not shown) is rotatably supported in a bearing member 58 (Figs. 2 and 5) depending from rail 28 of frame 18 and on the rearward side of rail 28 carries the sprocket 60 (Fig. 4). A shaft 62 (Fig. 1), rotatably connected between brackets 30 on frames 16 and 18 carries the respective sprockets 64 and 66 on opposite ends with sprocket 66 being connected to sprocket 60 (Fig. 4) by an endless chain 68. A shaft 70 (Fig. 1) substantially parallel to and on a slightly lower plane than shaft 62 is rotatably journalled to the same supports as shaft 62 and carries a sprocket 72 in lateral alignment with sprocket 64 (Fig. 5). On the outer surface of carrier 12 in lateral alignment with sprockets 64 and 72 we have provided a chain track formed by a pair of parallel spaced circumscribing ribs 74, and projecting perpendicularly from this track in spaced relationship about the carrier are the lugs 76 which in effect are sprocket teeth as will appear. An endless chain 78 extends around the carrier in the track between ribs 74 engaging the lugs 76, over sprocket 64, under sprocket 72 from the side adjacent sprocket 64 and upwardly around the outer side of sprocket 72 as shown in Figs. 1 and 5. Rotation of the carrier 12 as viewed in Figs. 1 and 2 is clockwise so that the path of chain 78 over sprocket 64 and under sprocket 72 (Figs. 1 and 5) produces a lifting effect on the carrier to relieve its weight on rollers 32 and 34.

The operation of this carrier so far described is as follows. Hay or the like will be blown into the carrier through pipe 48 which deflects it upwardly by incline 50 so as to not prematurely fill up the forward part thereof. Vents 38 permit the escape of air and dust that might otherwise blow out the front, although the use of the front sheet 44 and door 51 will effectively provide a closure at the front of the carrier, if desired. To unload the hay or the like from the front of the carrier, shaft 56 is connected in a well known manner to the power take-off of a tractor whereby the carrier rotates clockwise as viewed in Fig. 1. When this operation is in effect the plates or auger-like members 54 move the hay in screw conveyor fashion toward the front of the carrier where it is spilled out. Carrier 12 rotates on rollers 32 and 34 and as previously pointed out, the arrangement of chain 78 over sprockets 64 and 72 provides a lifting action on the carrier to relieve pressure and friction with the rollers. The speed of rotation of the carrier while not critical is recommended at approximately thirteen (13) R. P. M.'s.

It will be appreciated that the carrier 12 by virtue of its construction provides protection for the contents therein from the elements at all times. Door 51 which is easily detachable may be removed without materially affecting the cover protection for the contents of the carrier but we prefer to use it especially during transportation.

The facilitate the unloading of our carrier, we have provided for use therewith a conveyor unit indicated generally at 80 in Figs. 1 and 3. This is mounted to the front of the carrier 12 and comprises a trough-like open top housing or body 82 having generally the horizontal bottom 84 and upwardly sloping sides 86 and 88 and a rear crescent shaped flange-like wall 89 (Fig. 3). The length of this housing 82 is substantially the same as the distance between the upstanding arms 24 and 26 on frame member 18 and the entire unit is mounted to these arms 24 and 26 respectively by any suitable means such as the bracket 90. A chain conveyor means 92 with the spaced flights 94 is disposed within the housing 82 (Fig. 3) and moves in one direction in a horizontal path across the bottom 84 on the inside of bottom 84 and in the other direction along the underside of the bottom 84, passing at opposite ends of the bottom through the respective openings 96 and 98. For this purpose the sprockets 100 and 102 are provided as shown in a well known manner and towards side 86 of the housing 82 the chain 92 is inclined upwardly to pass over a sprocket 104 which is carried by a shaft 106 having a square socket portion that communicates with the rear of housing 82 through flange 89. Shaft 106 is positioned to register with the square end of shaft 62 (Fig. 2) that projects forwardly from brace 30 on frame 18 so that when this conveyor is mounted to the carrier as described, the square end of shaft 62 will enter the socket in shaft 106 on the conveyor to provide power from the tractor power take-off in operating chain conveyor 92.

On the underside of the bottom 84 of conveyor 80, a pair of spaced plates or flanges 108 (Fig. 6) depend extending perpendicular to conveyor sides 86 and 88 and to the underside of these flanges and perpendicular to their longitudinal axis are secured the spaced mounting members shown in the form of angle irons 110 (Figs. 1 and 4). Members 110 are detachably secured respectively to the respective rails 20 as shown in Fig. 4. The flanges 108 serve as spacer members to allow clearance for chain 92 below the bottom 84 (Fig. 3) and also raise the bottom 84 to the level of the top of rail 28 on frame 18, so that when this conveyor is mounted as described, the bottom 84 will be on the same plane as the bottom level of the carrier as it rotates in the unloading operation (Fig. 6). An arcuate guide plate 112 (Fig. 3) is used for chain 92 for obvious reasons.

Chain 92 on conveyor 80 as viewed in Fig. 3 moves from left to right so that hay and the like received from the carrier 12 is carried toward conveyor side 86. The discharge end of chain 92 is elevated from its receiving end as is apparent and as hay moves on chain 92 over sprocket 104 it will fall on a baffle plate 114 which is inclined downwardly to side 86. An end gate-like door 116 which serves as a closure for side 86 can be dropped to form a chute or slide as an extension of baffle 114 and can be positioned over a bin or the like to deposit the contents of the carrier at any selected place. Chains 118 support the gate 116 in a well known manner.

To keep the carrier from bouncing or otherwise moving out of place within frames 14, 16 and 18 we have provided the flexible straps or bands 120 of metal or the like placed at the front and rear respectively of the carrier when in use. As shown in Fig. 1 these straps engage the upper outer portion of the carrier near frames 14 and 18 and are detachably secured by bolts 122 or the like to the upstanding arms 24 and 26 of the respective frames 14 and 18. In addition we have formed tracks or channels around the carrier 12 by the parallel spaced ribs 124 for the respective rollers 32 and 34 to ride in which also keep the carrier properly positioned relative to the frames 14, 16 and 18.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claim, any modified forms of structure or mechanical equivalents which may be reasonably included within their scope.

We claim:

A carrier and unloader for hay, silage and the like, comprising, a U-shaped support member, roller members carried by the lower portion of said support member, a cylindrical housing nested in said support member and on said roller members, a spiral flange projecting inwardly from the inner side of said housing, drive means for rotating said housing about its longitudinal axis, a conveyor removably attachable to said support member adjacent one end of said housing, said conveyor operatively connected to said drive means, said conveyor positioned to move transversely of the longitudinal axis of said housing, a closure at one end of said conveyor, and said closure being movable to a position forming a discharge chute relative to the discharge end of the conveyor.

References Cited in the file of this patent

UNITED STATES PATENTS

| | | |
|---|---|---|
| 747,172 | Haug | Dec. 15, 1903 |
| 1,753,135 | Schuberth | Apr. 1, 1930 |
| 1,775,851 | Ely | Sept. 16, 1930 |
| 1,991,297 | Schluter | Feb. 12, 1935 |
| 2,000,631 | Windecker | May 7, 1935 |
| 2,116,603 | Holly | May 10, 1938 |
| 2,488,966 | Dear | Nov. 22, 1949 |
| 2,553,484 | Stauch | May 15, 1951 |
| 2,676,002 | Wolfe | Apr. 20, 1954 |
| 2,740,543 | Mounsdon et al. | Apr. 3, 1956 |